Figure 1:
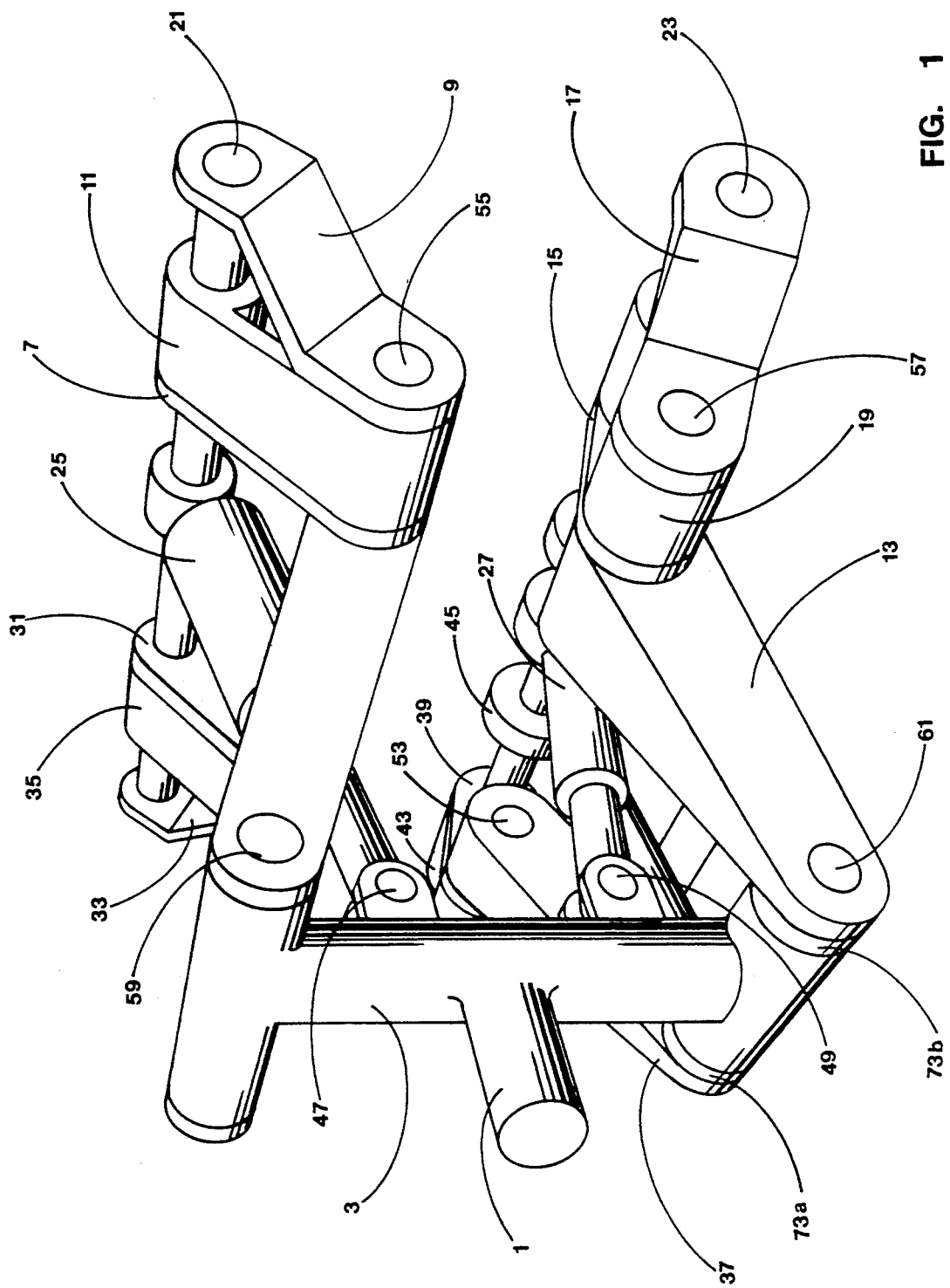

United States Patent [19]
Strasser

[11] Patent Number: 5,415,426
[45] Date of Patent: May 16, 1995

[54] FLEX ARM SUSPENSION

[76] Inventor: James P. Strasser, 2900 Rodd, Midland, Mich. 48640

[21] Appl. No.: 39,587

[22] Filed: Mar. 29, 1993

[51] Int. Cl.6 ............................................... B60G 3/00
[52] U.S. Cl. ................................. 280/690; 280/660; 280/702; 280/709; 280/718
[58] Field of Search ............... 280/690, 660, 661, 95.1, 280/702, 709, 718, 94

[56] References Cited

U.S. PATENT DOCUMENTS

| | | | |
|---|---|---|---|
| 3,603,421 | 9/1971 | Maeda et al. | 280/690 |
| 3,603,422 | 9/1971 | Cordiano | 280/690 |
| 3,689,102 | 9/1972 | Grunning | 280/690 |
| 3,913,932 | 10/1975 | Guerriero et al. | 280/690 |
| 4,483,552 | 11/1984 | Dorscht | 280/690 |
| 4,529,223 | 1/1985 | Kijima et al. | 280/690 |
| 4,530,514 | 7/1985 | Ito | 280/690 |
| 4,556,234 | 12/1985 | Mahnig et al. | 280/690 |
| 4,556,235 | 12/1985 | Giebel | 280/690 |
| 4,695,073 | 9/1987 | Pettibone et al. | 280/690 |
| 4,726,603 | 2/1988 | Sugiyama et al. | 280/661 |
| 4,842,295 | 6/1989 | Hawkins | 280/690 |
| 4,964,651 | 10/1990 | Kubo | 280/690 |
| 4,966,385 | 10/1990 | Iwasaki et al. | 280/690 |
| 4,968,056 | 11/1990 | Haraguchi | 280/690 |
| 4,969,661 | 11/1990 | Omura et al. | 280/690 |
| 4,973,070 | 11/1990 | Menichini et al. | 280/690 |
| 5,082,306 | 1/1992 | Khavkin | 280/661 |

FOREIGN PATENT DOCUMENTS

| | | | |
|---|---|---|---|
| 0001009 | 3/1979 | European Pat. Off. | 280/661 |
| 1240675 | 6/1986 | U.S.S.R. | 280/690 |
| 1446016 | 12/1988 | U.S.S.R. | 280/690 |

Primary Examiner—Eric D. Culbreth

[57] ABSTRACT

An independent vehicle suspension including triple jointed arm assemblies mounted to a centrally positioned spindle assembly. The angled configuration of the arms allow the spindle assembly to travel in any direction within the plane of suspension travel. Leaf springs, which mount to the inner arms of the arm assemblies, act in a manner to limit the rotation of the inner arms, and return the inner arms to a set position. Spring loaded struts mount to the spindle assembly and apply force to the spindle assembly. The springs and the spring loaded struts work in combination with the arm assemblies and allow the suspension to maintain camber, or follow a path of suspension travel as imparted by the driving surface. A travel stop limits the inward travel of the suspension to allow the suspension to experience forces incurred in situations other than straight line driving.

12 Claims, 9 Drawing Sheets

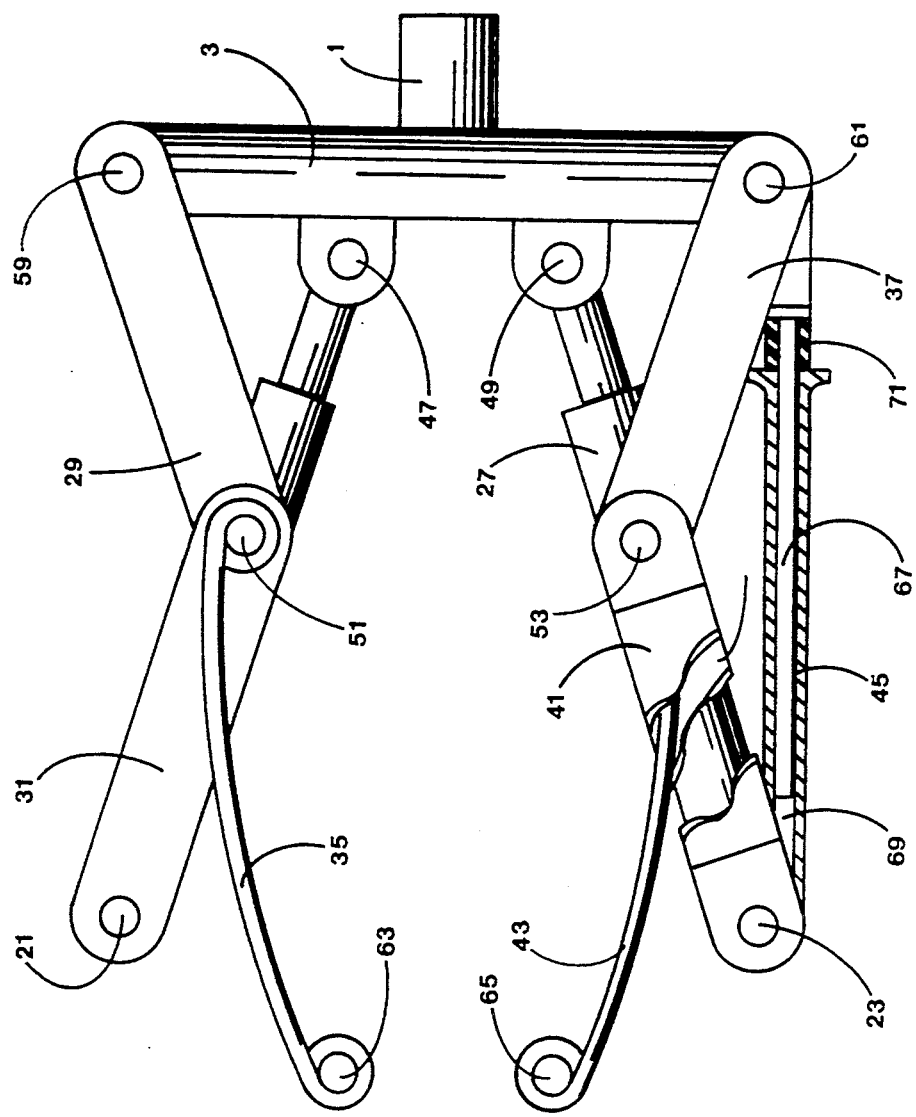
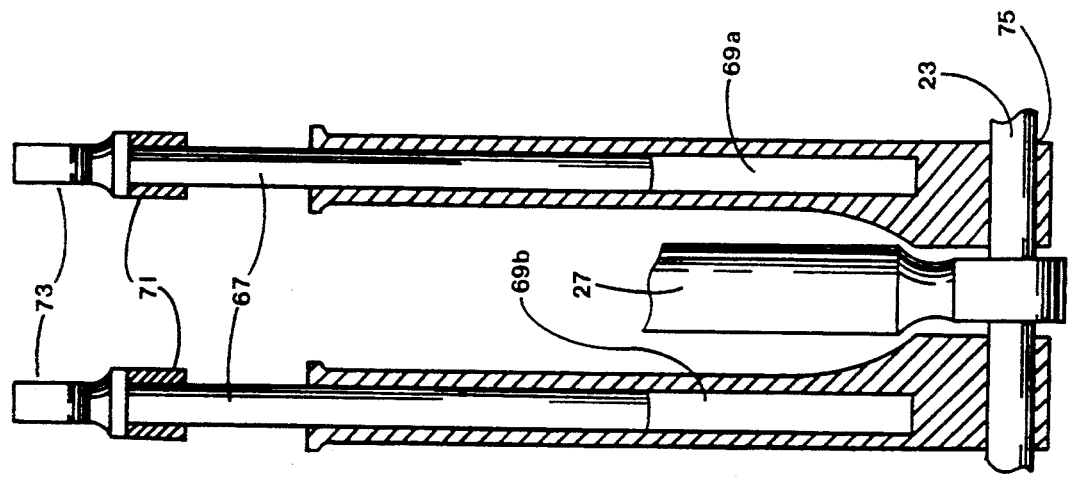

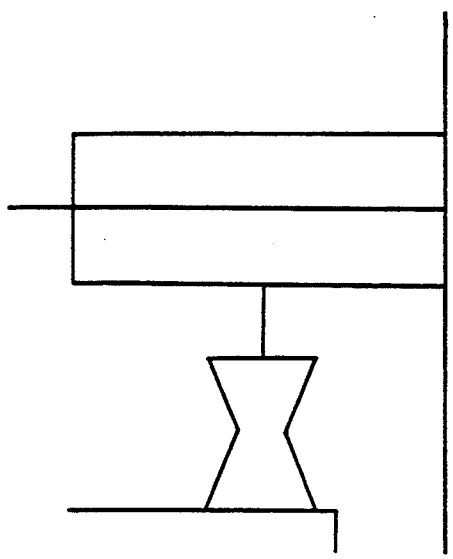
FIG. 5 (A)
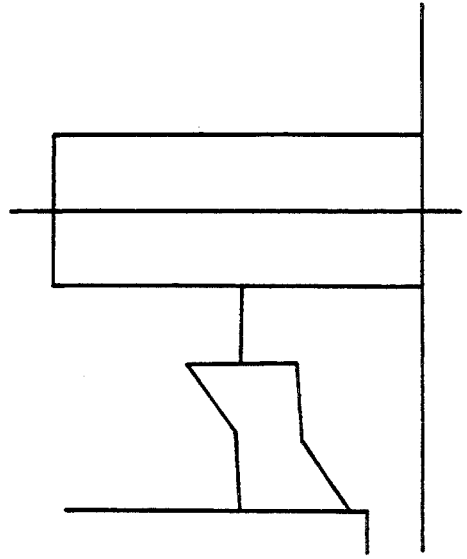
FIG. 5 (B)
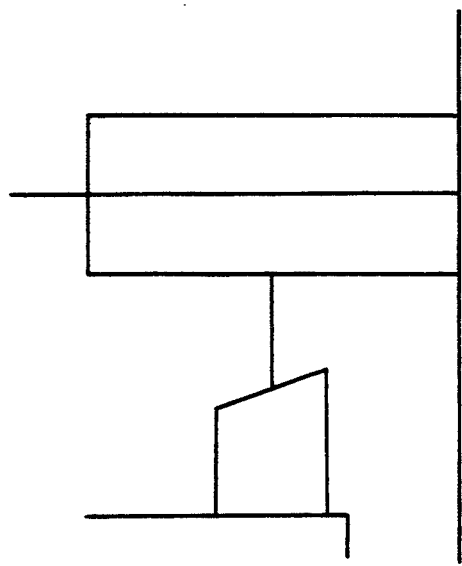
FIG. 6 (A) - Prior Art
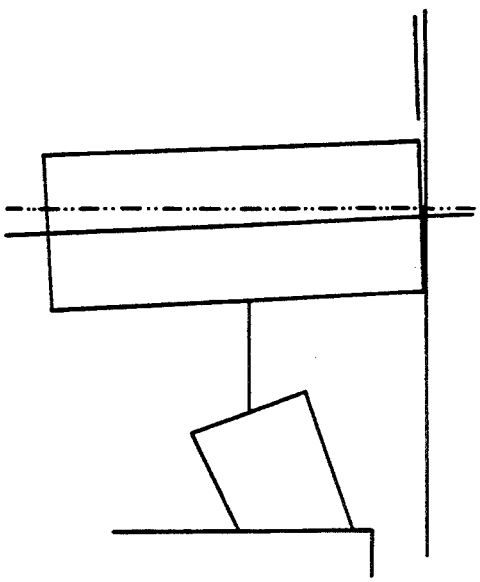
FIG. 6 (B) - Prior Art

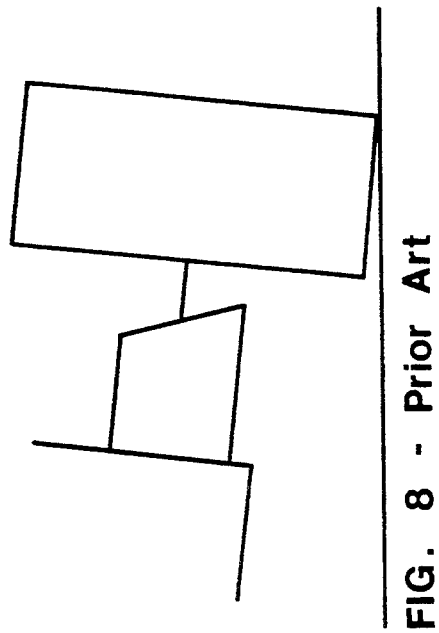
FIG. 8 - Prior Art
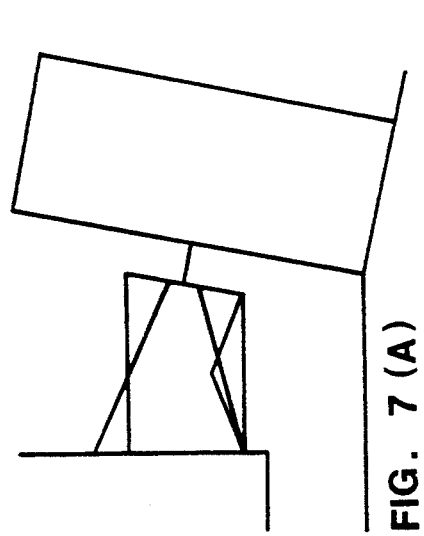
FIG. 7 (A)
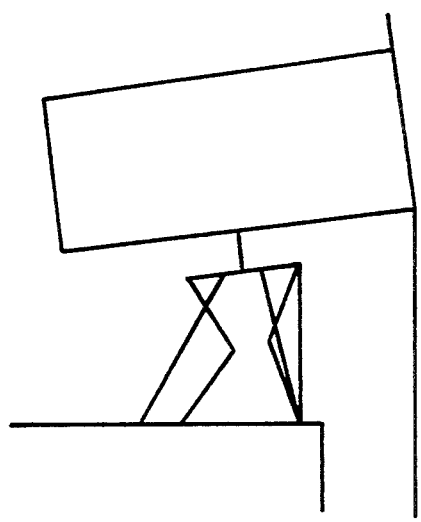
FIG. 7 (B)

FLEX ARM SUSPENSION

BACKGROUND

1. Field of Invention

An independent suspension especially, but not exclusively for wheeled vehicles.

2. Prior Art

The difficulties in achieving the optimum performance for the suspension of wheeled vehicles has resulted in numerous inventions and devices, which employ a wide range of strategies to reach that performance. Because of this, a condensed summation of the prior art is used, although the patent search extended much beyond the presented material. These patents represent key points in the suspension of wheeled vehicles, and therefore, a good basis for comparison with the flex arm suspension.

U.S. Pat. No. 4,973,070, 1990, F. Menichini, E. Perri.
U.S. Pat. No. 4,969,661, 1990, A Omura, M. Kikkawa.
U.S. Pat. No. 4,968,056, 1990, T. Haraguchi.
U.S. Pat. No. 4,966,385, 1990, T. Iwasaki, H. Shimonura.
U.S. Pat. No. 4,964,651, 1990, K. Kubo.
U.S. Pat. No. 4,842,295, 1989, G. Hawkins.
U.S. Pat. No. 4,695,073, 1987, C. Pettibone, D. Berry.
U.S. Pat. No. 4,556,235, 1985, F. Giebel.
U.S. Pat. No. 4,556,234, 1985, F. Mahnig, H. Meister.
U.S. Pat. No. 4,530,514, 1985, H. Ito.
U.S. Pat. No. 4,529,223, 1985, T. Kijima, J. Maebayashi.
U.S. Pat. No. 3,913,932, 1975, C. Guerriero, D. Hayward.
U.S. Pat. No. 3,689,102, 1972, O. Granning.
U.S. Pat. No. 3,603,422, 1971, E. Cordiano.
U.S. Pat. No. 3,603,421, 1971, T. Maeda, S. Miyata.

To help demonstrate how the flex arm suspension differs from the above suspensions, and to facilitate the explanation, a review of terms will be given and used again without explanation. Differences from the explained terms will be dealt with as they come up.

A-frame, arm, wishbone are terms that when referring to suspensions, accomplish a very similar task. What these devices do is connect the spindle assembly, sometimes referred to as a knuckle, or kingpin, depending on the type of suspension, to a frame, chassis, or suitable mounting point on the wheeled vehicle. The spindle is were the wheel is mounted. The arms, and their various permutations, usually rotate or pivot about the point where they mount. This allows the wheel to move with relative independence to the vehicle to which it mounts. All this is fairly obvious, but their limitations are not obvious. It must be kept in mind throughout this discussion, that arms, whatever their form, limits the path on which the wheel can travel. Multi-link is a term used to describe an increasingly wider range of suspension devices. For the most part, a suspension employing a multi-link design is one that is attempting to overcome the shortcomings of the arm, A-frame, or wishbone. Multi-links are usually comprised of rigid bars and flexible bushings, designed in such a fashion as to change the attitude of the wheel as it rotates about the arm, A-frame, or wishbone mounting point. Camber is a term used to describe the angle the wheel takes relative to the driving surface. Camber often changes as the arms rotate about their mounts. Centerline is an imaginary line that runs down the middle of the wheeled vehicle in a direction parallel to the rotation of the wheels. Toe in and toe out are terms used to describe the angle the wheel takes in relation to the centerline of the vehicle. Toe in is the wheel rolling in towards the centerline, and toe out is the wheel rolling out away from the centerline. Neutral toe is the wheel rolling parallel to the centerline. Toe can also be used to describe the deviation a wheel takes in relation to the ideal line needed to make a turn. This type of toe is an important consideration in steering, but outside of steering considerations, toe is usually a negative, which often results from flexible bushings mounted at critical points, or because of ball joints. Ball joints are the connection point between the knuckle, or spindle assembly, for some suspensions. Ball joints allow 360 degree rotation about the point where they mount on the arm. While this provides some advantages for the suspension, ball joints can allow toe in or toe out.

The arms of a suspension are mounted in various positions relative to the centerline of the vehicle. The A-frame, and wishbone style arms are mounted perpendicular to the centerline. The trailing arm suspension is mounted parallel to the centerline. The semi-trailing arm suspension is similar to the trailing arm, but is usually mounted at some angle off of parallel to the centerline.

These, of course, are generalities. Now, specifics can be discussed.

U.S. Pat. No. 4,973,070, 1990, F. Menichini, E. Perri, is a suspension designed to respond to the driving surface. The difference here is that this is an operative system. The flex arm suspension adjusts to the driving surface by responding to the forces created by moving over the driving surface. There is no need for outside manipulation in the flex arm suspension. Also, there is no flex arm assembly in the Menichini, Perri design. While there may be some similar intent in the concepts, the execution of the design is completely different.

U.S. Pat. No. 4,969,661, 1990, A. Omura, M. Kikkawa, is a multi-link design. As is typical with nearly all multi-link designs, the multi-link system attempts to correct wheel position problems that result from the limits of the arm movement. The A. Omura, M. Kikkawa design is no exception. The A-frame style arm sweeps out its arc, while the multi-links attempt to adjust the changing angle the wheel must make. The flex arm suspension does not need to sweep out an arc. A multi-link design is not needed to correct the changing angle of the wheel in the flex arm design because the wheel is not limited to one path. The arm design in the Omura, Kikkawa suspension limits the path the wheel can take, and so, is in need of a multi-link designed system. In this suspension, again, there is no flex arm assembly, and no opposing spring/strut design as in the flex arm suspension.

U.S. Pat. No. 4,968,056, 1990, T. Haraguchi, is an even more obvious A-frame design. It too employs a multi-link system. The same shortcomings expressed for the Omura, Kikkawa design apply here.

U.S. Pat. No. 4,966,385, 1990, T. Iwasaki, H. Shimonura is a double wishbone design. This employs the light weight nature of a wishbone design with the adjusting powers of a multi-link system. Again, the arms sweep out arcs that limit the path the wheel can travel. The multi-link attempts to adjust the wheel as the wishbones move through their arcs. There is no flex arm assembly in this design, and no opposing spring/strut design.

Nearly the same concept as above is employed in U.S. Pat. No. 4,964,561, 1990, K. Kubo. This is a wishbone design which also employs a multi-link system. The difference noted above for the Iwasaki, Shimonura design apply in this case.

U.S. Pat. No. 4,842,295, 1989 G. Hawkins, is a multi-link suspension system. Although this design differs somewhat from the designs above, the theme is obvious by now. This design also lacks the flex arm assembly, and the opposing spring/strut design.

The reason the above patents are discussed is because they are similar to the flex arm suspension in one respect. These designs all have arms, is some fashion or other, perpendicular to the vehicle centerline. The flex arm suspension is mounted in a similar fashion, but has the flex arm assembly, and the opposing spring/strut design. These above designs do not. The Menichini, Perri suspension demonstrates a version of suspension correction. The flex arm suspension is self correcting. The Menichini, Perri design needs an outside operator to correct it. The other suspensions use multi-link systems to adjust the wheel as it travels through its arc. The flex arm does not need multi-link adjustment. The flex arm design allows numerous paths, allows travel in a straight line, and under straight ahead driving conditions, is in no need of correction to maintain optimum wheel contact with the driving surface. And in essence, that is what all these devices and designs attempt to do. The point is, that the flex arm suspension is more than a refinement of the prior art. This is a new concept, executed in a fashion that makes it different from all other suspension design. To further underscore this, the flex arm design will now be compared to suspensions that differ even more than the previous examples.

U.S. Pat. No. 4,695,073, 1987, C. Pettibone, D. Berry is a design that employs a trailing arm suspension with adjustable camber and toe in. The advantages of a trailing arm design is that under normal driving conditions, this design can give response nearly perpendicular to the driving surface. The flex arm suspension does this as well. This particular design allows for adjustment of camber and toe in. This differs from the flex arm suspension. The flex arm suspension makes no provisions for camber adjustments, or toe adjustments. The kingpin/spindle assembly is mounted on opposite sides by the arm assemblies. This does not allow the wheel to twist in a manner that will cause toe in or toe out. Toe in or toe out adjustments are not needed on the flex arm suspension because toe does not occur. Camber adjustments are not needed either, because camber changes occur only at the very extremes of the flex arm response. The Pettibone, Berry design is very different from the flex arm design, and those of the wishbone and A-frame design, and yet, the flex arm can accomplish the perpendicular to the driving surface response that is considered a feature of the trailing arm design. Even though the flex arm eliminates changing camber and unwanted toe, there is no reason why the kingpin/spindle assembly could not be designed to incorporate such features as adjustable camber or toe. Features, such as passive steering, or straight line braking, or even active steering, which benefit from a certain amount of toe, are not contradictory to the flex arm design. Straight line trackability, or crosswind stability, which benefit from a slight camber, are not contradictory to the flex arm design. There are advantages to camber and toe, but only in specific situations, and only in controlled and measured amounts. Where the flex arm suspension differs is in the fact that the negative aspects of toe changes and camber changes are eliminated, thus eliminating the need to design around, or correct flaws that are inherent in so many other suspension designs. Clearly, the Pettibone, Berry suspension system is different from the flex arm design, but the advantages their design offers are matched, or can be matched, and as will be shown, can even be surpassed by the flex arm suspension.

U.S. Pat. No. 4,556,235, 1985, Giebel is a multi-link design. This design addresses the problem of toe in and toe out. The multi-link system in this design is designed to correct the problems of toe in and toe out. Because the kingpin/spindle assembly of the flex arm suspension is supported on both sides, top and bottom by the flex arm assemblies, the wheel will not twist about the kingpin/spindle assembly in a fashion that will cause toe in or toe out. Also, there are no flexible bushings at critical points that may cause the flex arm suspension to toe in or toe out. Unlike the Giebel design, no multi-link design is needed to correct toe in or toe out.

U.S. Pat. No. 4,556,234, 1985, F. Mahnig, H. Meister is a patent on an arm design. This arm does not possess the three jointed arm that the arm assemblies of the flex arm suspension does.

U.S. Pat. No. 4,530,574, 1985, H. Ito, is a trailing arm suspension. This is not a multi-link suspension, but the design does correct toe in. This differs from the flex arm suspension in that the flex arm suspension does not allow toe in or toe out. The Ito suspension possess dynamic toe correction. It changes toe by altering the wheel camber. The flex arm suspension does not generate camber changes through most of its travel, so on that point, these two suspensions differ. The Ito trailing arm design does not possess the flex arm design or the opposing spring/strut design.

U.S. Pat. No. 4,529,223, 1985, T. Kijima, J. Maebayashi, is a semi-trailing arm suspension. This particular design does employ a strut and spring design, namely, a McPhearson strut with a coil. This differs from the flex arm spring/strut design in the fact that the McPhearson strut works with the spring, not in opposition to it. The flex arm suspension uses countering balances of springs against spring loaded struts to produce its dynamic range of motion while preserving the angle of the wheel relative to the driving surface. Also, there is no flex arm design incorporated in the semi-trailing arm.

U.S. Pat. No. 3,913,932, 1975, C. Guerriero, D. Hayward employs a leaf spring and strut style suspension, and this too differs considerably from what has been discussed. This suspension clearly has no flex arm framework, or suspension arm in the typical sense. On that basis alone it is completely different from the flex arm suspension. Also, the strut and spring design does not work in opposition. The struts in the Guerriero, Hayward design bear the vehicle load, and dampen shock. For most practical purposes, the upper strut and the upper leaf springs in the flex arm suspension would share the load bearing duties. The leaf spring in the Guerriero, Hayward design is largely responsible for governing the suspension travel. This is true for the flex arm suspension as well. The leaf springs in the flex arm suspension, however, regulate the suspension travel by regulating the flex arm assembly framework. There is no such framework in the Guerriero, Hayward design, and no opposing spring/strut design. The leaf spring in this particular design connects between the two wheels, and to a degree acts as a a flexible arm, but it is not a flex arm in the sense that the leaf spring is still limited to a single arc that it can sweep out. Also, the connection by the leaf spring between the two wheels means this is not an independent suspension. The flex arm suspension is an independent suspension.

U.S. Pat. No. 3,689,102, 1972, O. Granning is a trailing arm design suspension. Again, there is no flex arm design, and no opposing spring/strut design. This design differs from the flex arm suspension on almost all points.

U.S. Pat. No. 3,603,422, 1971, E. Cordiano, is also a trailing arm suspension. This particular suspension features static toe in control. The differences of the trailing arm suspension have already been made clear. They apply here. The static toe in control is adjustable in this particular suspension. While this concept is not contradictory to the flex arm suspension, toe in or out control is not a feature of the flex arm suspension. The wheel in the flex arm suspension is held parallel to the vehicle centerline, and toe is not allowed by the flex arm assemblies. These two suspensions also differ on this point.

U.S. Pat. No. 3,603,421, 1971, T. Maeda, S. Miyata is a semi-trailing arm suspension. Again, no flex arm design, and no opposing spring/strut system is incorporated. This design does allow for the changing of camber as the arms sweep through its arc, and on that point, differs from the flex arm suspension. The toe control of this type of suspension, or of any suspension has been addressed, and so, this suspension differs from the flex arm suspension in that respect.

The obvious points as to where the flex arm suspension design differs from other suspensions is in the flex arm itself, and the opposing spring design. This is a clear cut difference over the prior art. The results of this design also goes further to separate it from the prior art. The presented cases were just a summation of the research into the prior art. The research was much more extensive, but all cases reviewed proved to be substantially different from the flex arm suspension in both design, and overall results that could be achieved.

OBJECTS AND ADVANTAGES

Suspensions for wheeled vehicles are designed solely for function, and a review of the prior art quickly highlights what the ideal criteria for that function are. A comparison of the flex arm suspension to these ideals also reveals that the flex arm suspension meets these criteria exceptionally well. Some of the major criteria are:
 a) Suspension travel free of camber change.
 b) Optimal wheel contact with the driving surface.
 c) Elimination of scuffing.
 d) Elimiantion of unwanted toe.
 e) Provide a controllable ride.

These five criteria are more than just ideals. Failure to come close to them has ramifications for the wheels, the suspension and even the vehicle itself. To truly understand the bows and whys of these criteria, and how the flex arm suspension meets them, examples and explanations will be given.

Suspension travel free of camber change is an important criteria because changing camber changes contact the wheel has to the driving surface. FIGS. 5(A) and 5(B) and FIGS. 6(A) and 6(B) are good demonstrations of this fact. FIG. 5 represents the flex arm suspension. FIG. 6 represents a typical suspension. This particular suspension would be akin to the A-frame, or wishbone style of suspension. This is a side by side comparison of the two suspensions. FIGS. 5(A) and 6(A) show the suspensions in their normal positions. FIGS. 5(B) and 6(B) show the suspensions at a similar point through their travel. The lines that run through the wheels are imaginary bisecting lines used to demonstrate wheel movement other than perpendicular to the driving surface. As can be seen in FIG. 6, when the suspension goes through its travel, the wheel tilts, lifting the contacting part of the wheel off the driving surface. If examined even more closely, the wheel can be seen to move across the driving surface. This motion is called scuffing. The implications are clear. First, part of the wheel looses contact with the driving surface. Secondly, the wheel is pulled across the driving surface, although in this case, only slightly. This dragging of the wheel across the driving surface, or scuffing, not only wears the wheel, but also pulls the vehicle from one side to another. The particular suspension in FIG. 6 is not the exception to the rule in suspensions. This so called short arm, long arm style of suspension is in fact a standard. Arms of equal length can be used in this suspension, and this would produce camber change free travel, but at a cost of a greater scuff distance. As the arms become closer to equal length, the greater the scuff distance becomes, and wear on the wheel increases. The more the arms vary in length, the greater the camber change becomes, and the more the wheel looses full contact with the driving surface during suspension travel. The short arm, long arm suspension is then a compromise, opting for camber change to limit scuffing distance. The wheel attached to the flex arm suspension does not change camber, and is not dragged across the driving surface, as FIG. 5 demonstrates. Wheel contact is maintained. Excess wear is eliminated, and the vehicle is not pulled as the suspension moves through its travel.

Figure 9:
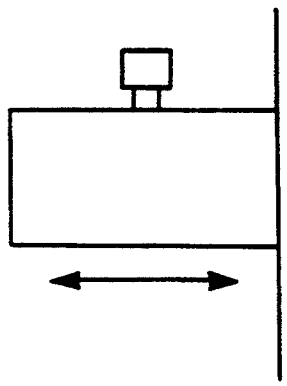
Figure 9:
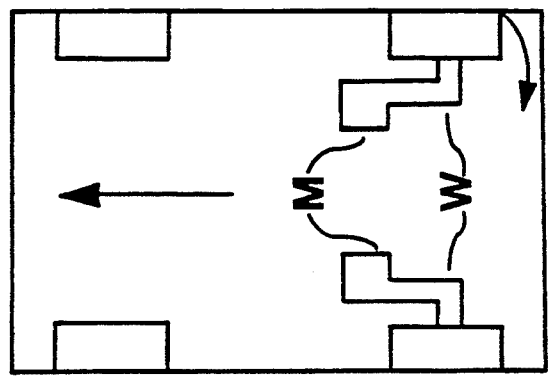
Figure 9:
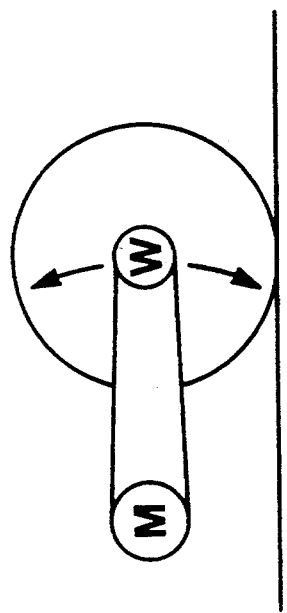
Figure 9:
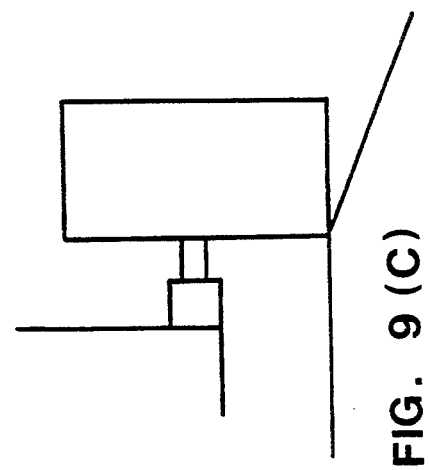
Figure 10:
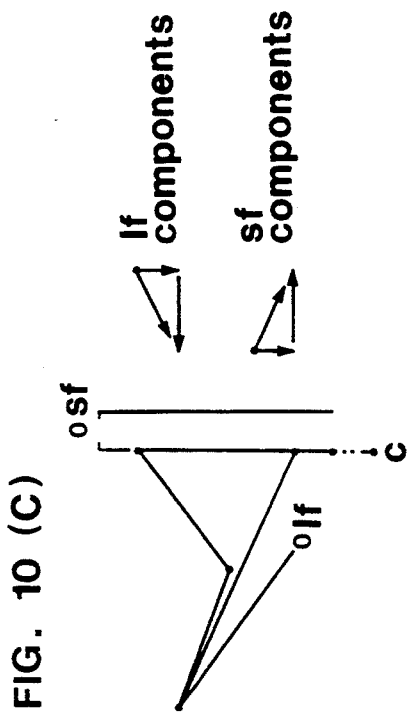
Figure 10:
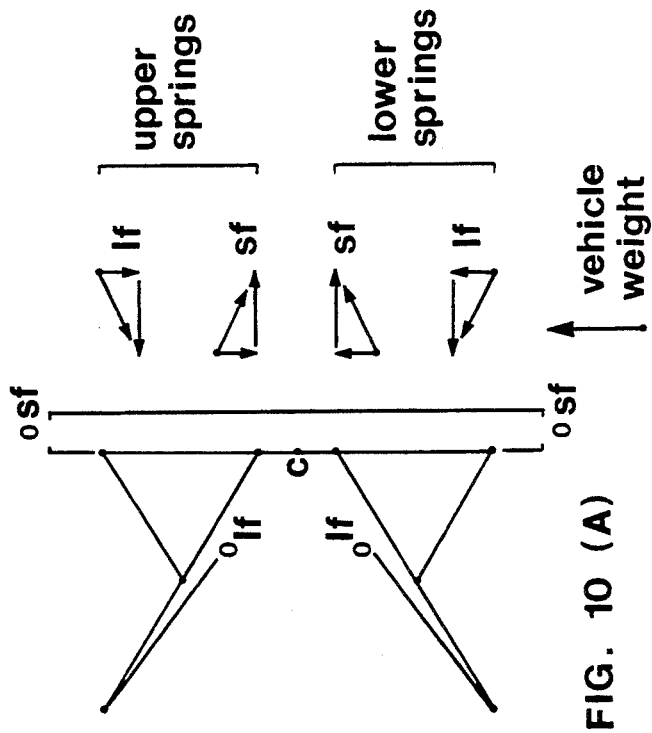
Figure 10:
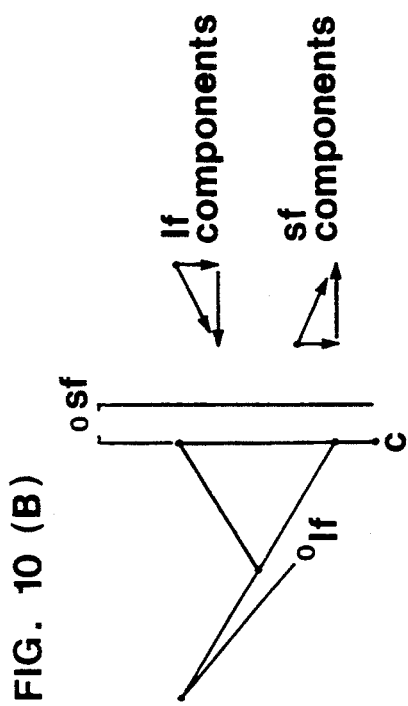
Figure 10:
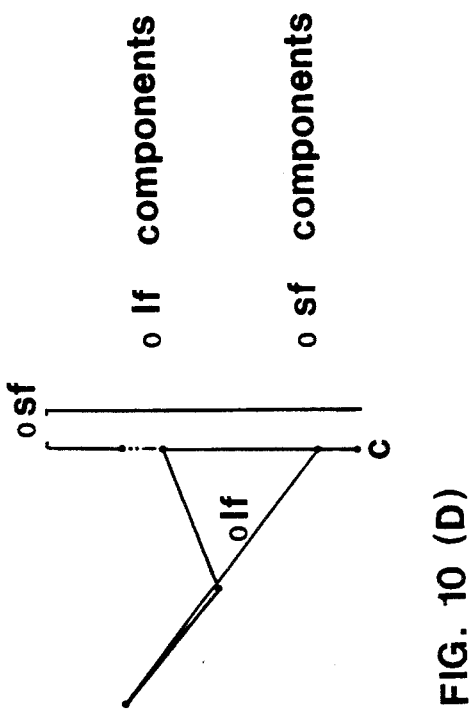
Figure 10:
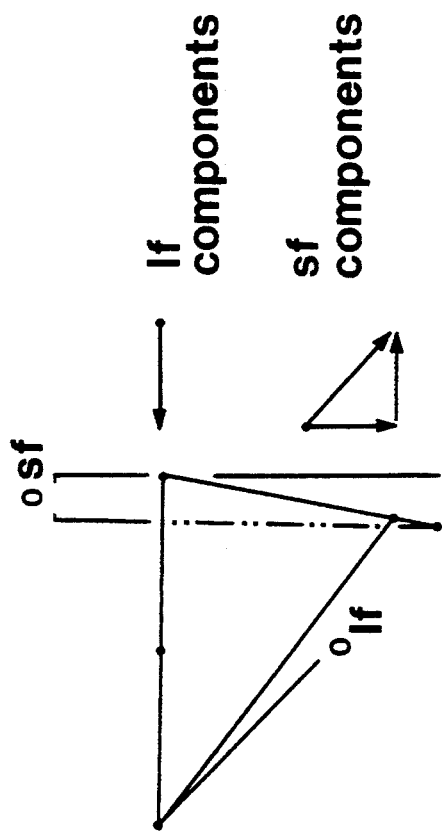
Figure 10:
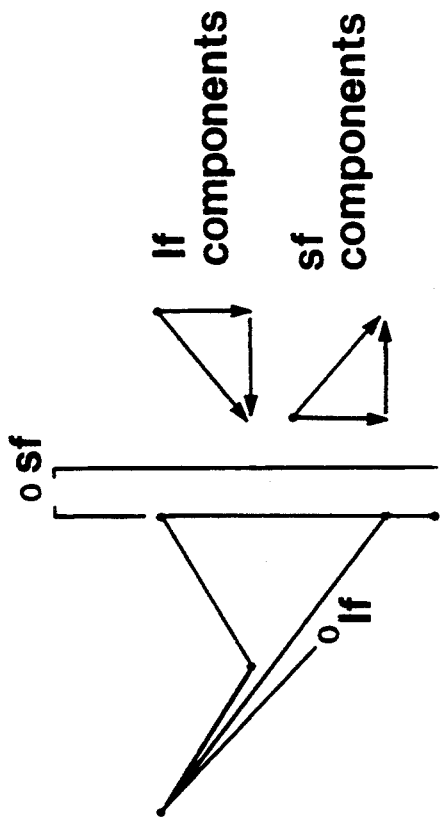
Figure 10:
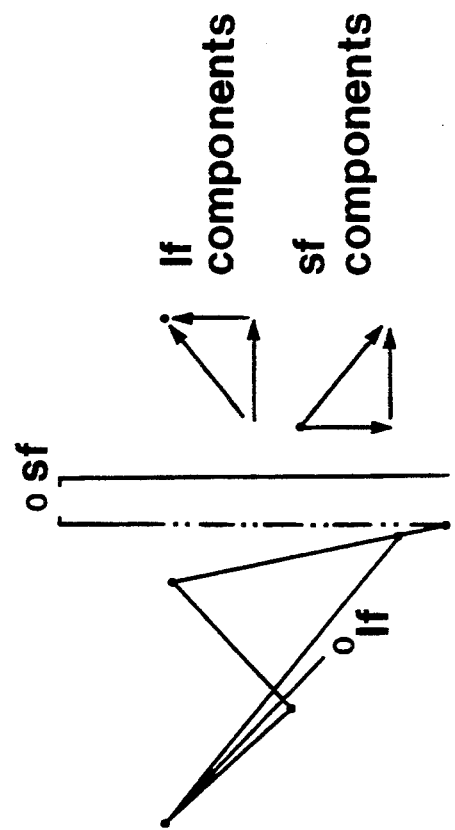

The flex arm suspension is not the only suspension that can claim camber change free travel. FIG. 9 demonstrates the trailing arm style of suspension, which boasts a camber change free travel. FIG. 9 shows how this is so. In FIGS. 9(A) and 9(B) there is a head on view and a side view of the trailing arm suspension. Point m is where the suspension mounts to the vehicle, and point w is where the wheel mounts to the suspension. The arm rotates about point m allowing the wheel to respond to the driving surface. While this appears to be an arcing motion when viewed from the side, when viewed from straight on, it translates into a perpendicular to the driving surface motion, which is free of camber change. FIG. 9(C) shows how the the trailing arm responds to changes in the angle of the driving surface. Comparing this to FIGS. 7(A) and 7(B), the differences in the flex arm suspension become apparent. FIG. 9(D) shows the trailing arm suspension responding to forces perpendicular to its line of motion. The trailing arm is only mounted at point m, and under forces perpendicular to the vehicle centerline, the wheels tend to rotate about point m in a fashion perpendicular to their normal travel as depicted by the arrows touching the wheels. This action can lead to an excess of motion, a phenomenon known as sway. Although all suspensions can experience sway, it is particularly pronounced in trailing arm suspensions. It is much less pronounced in suspensions with arms mounting perpendicular to the vehicle centerline, which the flex arm suspension is. Semi-trailing arms may go a long ways towards eliminating the sway inherent in the trailing arm design, but often do so at the cost of camber change free travel. This is because semi-trailing arms mount at some angle off of parallel to the vehicle centerline. So, a compromise is seen again, the elimination of sway for better controllability, at the cost of camber change free travel.

Still, camber change free travel is only really possible in a suspension that allows the arms to sweep out multiple paths. Even in the trailing arm suspension, camber changed as the vehicle body changed position relative to the driving surface. It is a simple fact of geometry. One set path cannot have the same relation to the driving surface given the various positions the vehicle body can take. It is also a principle of physics that inertia remains the same when no outside force acts upon it. The interia for a suspension comes from the vehicle driving across the driving surface. In most suspensions, springs counter that inertia, as well they should, to absorb the forces transmitted from the driving surface. This occurs in the flex arm suspension as well, but the countering forces of the springs absorb the force without changing the direction of the force. The arms then change their length, by extending or contracting at the joints to match the travel the driving surface has imparted. This is why the flex arm suspension is different from all other suspensions, and how it is capable of a dynamic range of responses.

Optimal wheel contact with the driving surface is another advantage of the flex arm suspension. The principles discussed above are the reason why the flex arm suspension is capable of optimizing wheel contact. The driving surface dictates the position the wheel takes, and FIG. 7 demonstrates this. FIG. 7(A) shows the flex arm suspension responding to a decline in the driving surface. FIG. 7(B) shows the suspension responding to an incline in the driving surface. In all cases the travel stop is shown. It is the line parallel to the driving surface, running between the vehicle body, and what represents the kingpin/spindle assembly. This is drawn to show the inward limit of the lower arms. As shown, the wheel can maintain optimal contact with a surface by tilting. In FIG. 9, it is clear the same cannot be said for for the trailing arm suspension. FIG. 8 clearly shows that an A-frame style suspension would have similar difficulties optimizing wheel contact in an off angled situation. Clearly, optimal wheel contact can be maintained over a greater range of conditions with the flex arm suspension than is possible with any other type of suspension.

Figure 4:
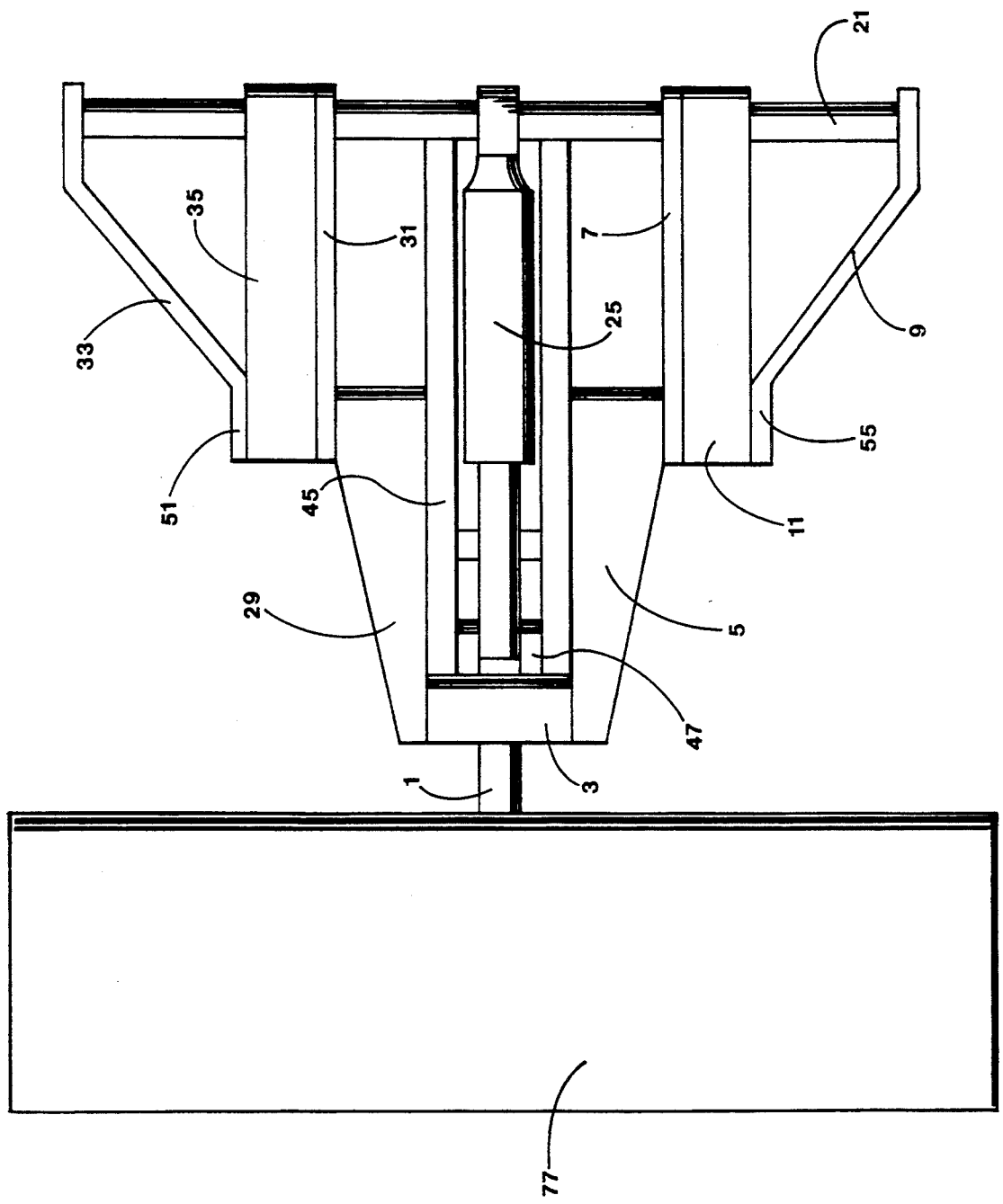
Figure 11:
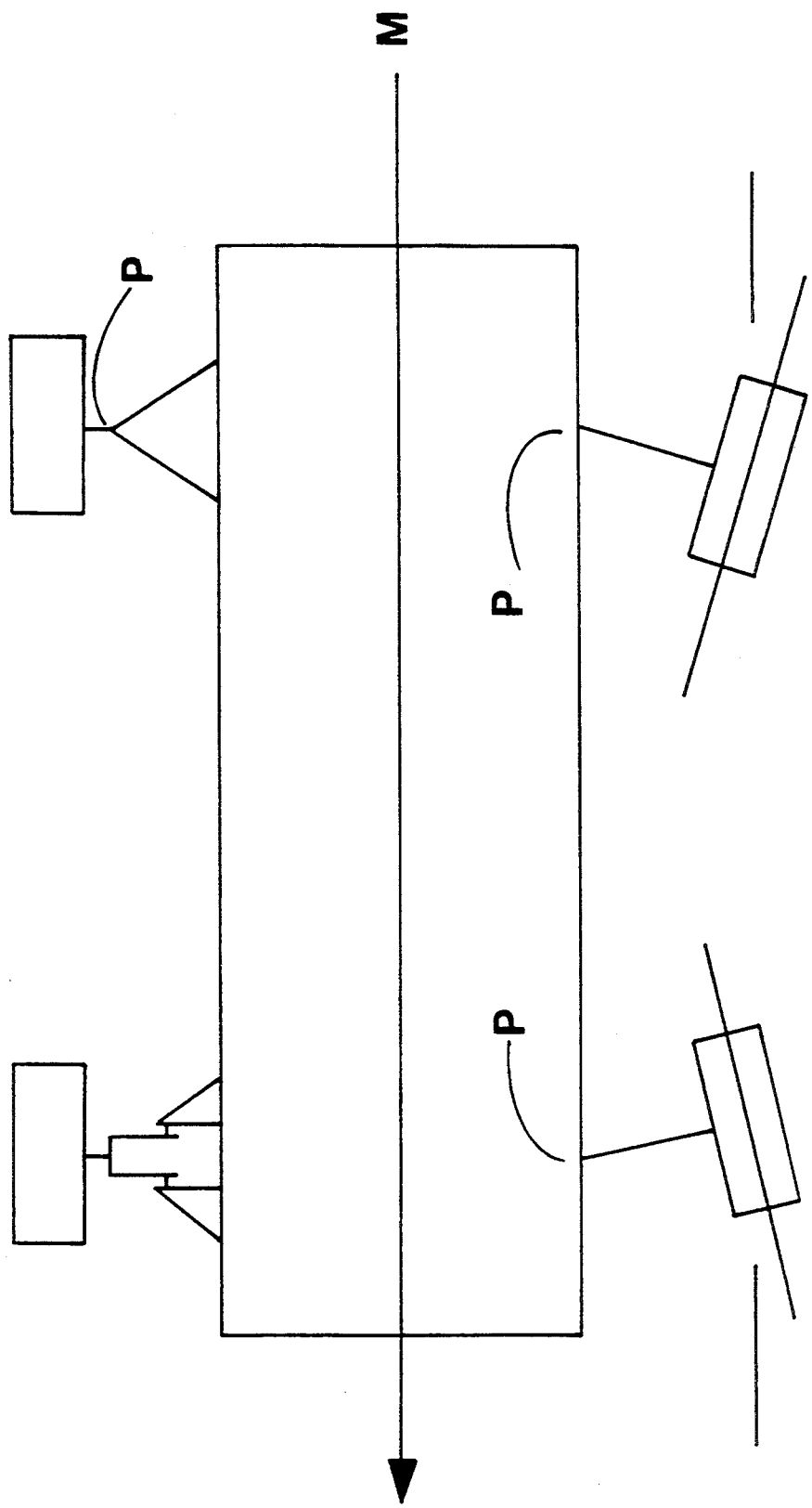

Elimination of negative toe is another advantage of the flex arm suspension. Negative toe in this case means unwarranted or unnecessary toe. Toe occurs because of flexible matter at key points, or because of ball joints. Flexible matter, or bushings, can buffer a harsh ride, or allow a suspension arm a greater degree of freedom to match the driving surface. Ball joints allow wheels to turn, and offer a greater degree of freedom. The uses of these devices, however, can lead to a degree of slop. The result of this slop is that as a vehicle travels across a driving surface with irregularities, such as bumps, or even as a vehicle accelerates or decelerates, a suspension can allow toe. Why this would not occur in the flex arm suspension is because it does not employ such devices at critical points. All joints in the flex arm assembly are mounted solidly together so that rotation about the joint is only in one plane. Flexible bushings are not needed to offer greater degrees of freedom because the flex arm design itself allows that freedom. The compound opposing spring action and the very flexible nature of the suspension means that forces transmitted from the driving surface are more apt to be absorbed and dissipated by the flex arm suspension than would be expected for other suspensions. Also, the kingpin design of the flex arm suspension allows for a more rigid mounting scheme by the arm assemblies, as can be seen in FIGS. 1 and 4. FIG. 11 is a representation of toe. The upper right hand wheel on the schematic vehicle is a representation of the flex arm suspenion. The lower right hand wheel is a typical suspension. The vehicle is traveling in the direction of the arrow, and also represents the up direction. The upper left wheel is experiencing toe out. The lower left wheel is experiencing toe in. Point P, in the lower right wheel could be a ball joint. Points P for the left wheels could be flexible bushings, or simply a narrow arm that bows under force. As can be seen, there are no ball joints in the flex arm design. The flex arm suspension is broad at its mounting points, and as already stated, in no need of flexible bushings. Negative toe is undesirable because it can turn the wheel away from its normal direction of rotation, which can cause wear, and make the vehicle track in unwanted directions. In contrast to other suspensions, the flex arm suspension can hold a wheel in constant position with reguard to the vehicle centerline.

The flex arm suspension allows camber change free travel without inducing scuffing. It allows the wheel to maintain optimal contact with the driving surface over a variety of conditions. The wheel is rigidly held parallel to the centerline, and so, reduces unwanted toe. Providing a controllable ride is all that is left of the five criteria. By achieving the previous objectives, great strides towards that goal have already been made. Rating springs to determine the desired suspension travel is also possible. Further efforts can be made by dampening the spring loaded struts, thus reducing disturbing vehicle oscillations caused by responses to surface irregularities.

The objects and advantages of the flex arm suspension are indeed numerous. The means by which it achieves those advantages are also unique. This is why the flex arm suspension is a concept unlike any to date.

DRAWINGS AND FIGURES

FIG. 1, perspective view.

FIG. 2, side cut away view showing right inner arms, travel stop compressed into channel, and leaf spring mounts.

FIG. 3, top cut away view of travel stop extended, and relative to the lower pivot axis, and lower strut.

FIG. 4, top view with a wheel.

FIGS. 5(A) and 5(B), schematic representation of flex arm suspension travel.

FIGS. 6(A) and 6(B), schematic representation of standard suspension travel.

FIGS. 7(A) and 7(B), schematic representations of flex arm suspension with reguards to various angle driving surface orientations.

FIG. 8, a typical suspension and response to off angle driving surface orientation.

FIGS. 9(A)-9(D), a typical trailing arm suspension, its attributes, and its shortcomings.

FIGS. 10(A)-10(F), schematic representation of the vector force components for various positions of the flex arm suspension.

FIG. 11, schematic representation of toe.

REFERENCE NUMERALS

1. Spindle

3. Kingpin
5. Left Upper Outer Arm
7. Left Upper Inner Arm
9. Left Upper Lateral Stablizer
11. Left Upper Leaf Spring
13. Left Lower Outer Arm
15. Left Lower Inner Arm
17. Left Lower Lateral Stabilizer
19. Left Lower Leaf Spring
21. Upper Pivot Axis
23. Lower Pivot Axis
25. Upper Strut
27. Lower Strut
29. Right Upper Outer Arm
31. Right Upper Inner Arm
33. Right Upper Lateral Stabilizer
35. Right Upper Leaf Spring
37. Right Lower Outer Arm
39. Right Lower Inner Arm
41. Right Lower Lateral Stabilizer
43. Right Lower Leaf Spring
45. Travel Stop
47. Upper Strut Joint
49. Lower Strut Joint
51. Right Upper Elbow
53. Right Lower Elbow
55. Left Upper Elbow
57. Left Lower Elbow
59. Upper Kingpin Pivot Mount
61. Lower Kingpin Pivot Mount
63. Upper Leaf Spring Mount
65. Lower Leaf Spring Mount
67. Slide
69. Channnel
71. Flexible Bushing
73. Travel Stop Lower Kingpin Pivot Mount
75. Travel Stop Lower Pivot Axis Mount Slot
77. Wheel

DESCRIPTION

FIGS. 1, 2, and 4—This particular embodiment of the flex arm suspension consists of upper and lower flexible arm assemblies mounted to a kingpin 3, and a spindle 1, assembly by means of an upper kingpin pivot mount 59 and a lower kingpin pivot mount 61 at one end, and to a frame, chassis, or suitable mounting point at the other end. There are a total of four flexible arms. Each arm is comprised of two parts, referred to as inner arms 7, 15, 31, 39, and outer arms 5, 13, 29, 37. The inner and outer arms are joined together by a joint which is referred to as an elbow 51, 53, 55, 57, and which allows rotation between the two arms about the joint axis.

In the completed assembly, there is a right upper inner arm 31, a right upper outer arm 29, a left upper outer arm 5, a left upper inner arm 7, a left lower outer arm 13, a left lower inner arm 15, a right lower outer arm 37, and a right lower inner arm 39, all of which mount to the centrally positioned kingpin 3, and spindle 1 assembly. Mounted between the flex arm assemblies are two spring loaded, dampened struts, designated an upper strut 25, and a lower strut 27. These struts connect at pivot axes 21, 23, and at strut joints 47, 49. The struts are mounted so as to rotate about the pivot axes, and also about the strut joints. The strut joints are mounted to the back of the kingpin 3, and are positioned as required by the demands placed on the suspension.

Mounted to elbows the elbows 51, 53, 55, 57, of the flex arms are leaf springs that run from the elbows back to a frame, chassis, or other suitable mounting point, including the pivot axes, as shown in FIG. 1, or to an upper leaf spring mount 63 and a lower leaf spring mount 65, as in FIG. 2. This makes for a total of four leaf springs designated as a right upper leaf spring 35, a left upper leaf spring 11, a right lower leaf spring 43, and a left lower leaf spring 19.

The inner arms 7, 15, 31, 39 of the flex arm assemblies are supported by lateral support arms which mount at the respective elbows 51, 53, 55, 57, and again at their respective pivot axes 21, 23. There are a total of four lateral support arms, designated as a right upper lateral stabilizer 33, a right lower lateral stabilizer 41, a left upper lateral stabilizer 9, and a left lower lateral stabilizer 17. The lateral stabilizers act as supports for the inner arms of the flex arm assemblies, as well as providing support for the leaf springs mounted at the elbows. The lateral stabilizers rotate about the same pivot axes as does their respective inner arms, while being rigidly mounted to their respective elbows.

A travel stop 45 assembly connects from the lower pivot axis 23 to the lower kingpin pivot mount 61. The travel stop not only rotates about the lower pivot axis and the lower kingpin pivot mount, it also has the ability to extend by means of a slide 67. The upper outer arms 5, 29 can rotate about the upper kingpin pivot mount 59. The lower outer arms 13, 37, can rotate about the lower kingpin pivot mount 61. All aforementioned rotations, whether referring to the outer arms or not, are only about the mounting axes, and only in a plane perpendicular to the mounting axes.

OPERATION

FIGS. 1 to 5, 7, 10, and 11—The countering forces of leaf springs 11, 19, 35, 43 against two struts 25, 27, force arms 5, 7, 13, 15, 29, 31, 37, 39, and a kingpin 3, spindle and thus a wheel 77, into a steady state. FIG. 10(A) is a schematic of this. The restoring forces of the leaf springs attempt to return inner arms 7, 15, 31, 39 to a zero point. The zero points are the relaxed positions of the unloaded springs. 0 1f is the zero position of the leaf spring. 0 sf is the zero position for the strut. As leaf springs attempt to pull the inner arms towards the zero position, that force is transferred via outer arms 5, 13, 29, 37 to kingpin pivot mounts 59, 61. This force pulls the kingpin spindle assembly inboard. This is diagrammed in vector components to the right of the FIG. 10 figures. In this diagram, 1f is the label for the leaf spring vector components. The struts 25, 27, attempt to expand outward towards their zero position. That force can also be represented in component form, and is done so to the right of the FIG. 10 figures, and labelled sf. Immediately apparent are the opposing forces, both in the horizontal orientation and in the vertical orientation. Also, the matched spring sets, whether it is the upper springs, or the lower springs, have reinforcing vertical components, but opposing horizontal components. If the springs are rated in such a fashion that when the kingpin/spindle assembly moves in a straight line, as diagrammed in FIGS. 10(B), 10(C), 10(D), that the horizontal forces cancel, then straight line is the path that will be taken, if a perfectly vertical impulse is applied to the suspension. Naturally, consideration must be given to the appropriate force moment when rating the springs. FIG. 10(B) shows the top half of the suspension. Point c is the center of the kingpin/spindle assembly. FIG. 10(B) is the equilibrium point. The point where all forces balance out. The springs would be rated to achieve this position. This is also the point of lowest energy, a natural consequence of the equilibrium position, and an idea that will be brought up again. FIG. 10(C) shows the suspension through an upwards point of travel. In FIG. 10(C) the inner arm has moved further away from its zero position. This means the leaf spring has a greater restoring force, and so, greater 1f component forces. Also during this travel the strut has moved. As the strut rotates its mounting points upwards, the kingpin/spindle assembly is pulled with greater force by the leaf spring. This inward pull compresses the strut until the horizontal forces cancel each other out. So, by properly rating the springs, straight line motion can be assured. FIG. 10(D) shows the suspension in a downward part of travel. At this particular point in travel the leaf spring and the strut have both reached their zero point. The strut had to elongate to reach this point, and in doing so, unloaded completely. This is also a point of low energy for this set of springs, and is a point which is appropriately on the vertical line needed for ideal suspension travel. Since this is only one set of springs, and there is a corresponding opposite set of springs that can be set in a similar fashion, it is possible to put three points of low energy on the ideal path of travel. The implications are clear. The path with the lowest energy is the path most likely traveled.

There are, of course, numerous points in between those three aforementioned points. So, it is instructive to examine other positions that the flex arm suspension can allow. FIGS. 10(E) 10(F), and 10(G) show schematics of three different positions. FIG. 10(E) is the steady state position. FIG. 10(F) shows the kingpin/spindle assembly in a tilted position which extends the arm assembly. FIG. 10(G) shows the kingpin/spindle assembly at a tilt which compresses the arm assembly. As is typical FIG. 10(E) shows the opposing 1f component and sf component. The vector components in FIG. 10(F) show the 1f component pulling entirely in one direction. A direction that would return the kingpin/spindle assembly back towards the steady state position. The sf components for sf in FIG. 10(F) are similar to those in FIG. 10(E), but logically, they would be diminished in magnitude, because the strut would be more extended. FIG. 10(G) shows the 1f components directing the force in a completely opposite direction. The sf components are again similar to those in FIG. 10(E), but would be greater in magnitude because the strut is more compressed. This is only half the suspension. An opposite effect is occurring in the undiagrammed portion. If the top part of the suspension was tilting, as in FIG. 10(F), then the bottom half would be reacting like FIG. 10(G). This means there is even greater resistance to such twisting motion. In addition, a travel stop 45, is in place for the bottom half of the suspension, which would alter the dynamics of the suspension. For example, if the drawing in FIG. 10(F) was the top portion of the suspension, the suspension would not react exactly this way. Rotation about point c would not happen because the travel stop stops the inward travel of the lower half of the suspension. This would make a movement such as in FIG. 10(F), substantially more difficult.

But movement as diagrammed in FIGS. 10(F) and 10(G) are possible to a degree. FIG. 7 shows conditions that make such movements possible. It has been stated that the travel for the wheel is straight, and vertical, but this only holds true for balanced, vertical forces. FIG. 7(A) shows the wheel of the flex arm suspension altering its position to a decline in the driving surface. FIG. 7(B) shows the wheel altering its position to an incline. Both figures in FIG. 7 have the vehicle body at some different angle then the wheel. This means any force directed through the wheel will be distributed unevenly through the wheel. This unbalanced force is transmitted up through the kingpin/spindle assembly to the suspension. This unbalanced force will have vector components too, which will reinforce or cancel the force components of the springs. This is why the wheel alters its position and travel path.

Also, because of the unique arm design, scuffing is substantially eliminated. FIG. 5 shows the flex arm suspension at its steady state, and then displaced a certain point through its travel. Since the arms can change distance, the wheel is not dragged across the driving surface by the arms. The horizontal forces of the springs have been designed to cancel, and so impart no other force to make the wheel scuff. The wheel simply travels in the direction the force has imparted. The joints of the arms allow free rotation and so, impart no substantial force as the arms alter their position.

The arms of the flex arm suspension mount at a upper kingpin pivot mount 59, and a lower kingpin pivot mount 61. The upper kingpin pivot mount is above the spindle 1, and allows arms to mount right and left on the kingpin 3. The lower kingpin pivot mount is below the spindle, and allows the lower arms to mount in a similar fashion. This can be seen in FIGS. 1, 2, and 4. The kingpin as viewed in FIG. 4, can clearly be seen to be held on either side by a left upper outer arm 5, and a right upper outer arm 29. The upper kingpin pivot mount 59, not seen in FIG. 4, but visible in FIGS. 1 and 2, would be similar to a bar that runs from the left upper outer arm 5, through the kingpin 3, to the right upper outer arm 29. The arms would mount flush to the kingpin, and allow rotation in one plane. The same could be said for all joints, and the planes they allow would all be parallel. This would allow for motion as in FIGS. 5, 7, and 10, but would substantially limit toe.

The travel stop 45, is positioned to stop inward travel of the suspension. Inward travel of the suspension would result if the vehicle was traveling in a direction other than straight ahead. When turning or sliding, the wheel would be pushed inwards. At a set point, the travel stop compresses completely in to its frame, and stops the lower part of the kingpin from moving inward. At this point, the lower arms become rigid, as would be needed in a condition of a turn or a slide. When traveling straight ahead, the travel stop cannot interfere with the normal function of the flex arm suspension. To do this, the travel stop has a slide 67, which can extend freely as is needed to match suspension travel. The entire travel stop rotates as the suspension travels, rotating about a travel stop lower kingpin pivot mount 73, for the slide, and about a travel stop lower pivot axis mount 75, for the travel stop frame. The slide moves freely in and out of channels 69, which act as guides to assure the travel stop is always in position to stop inward travel. A flexible bushing 71 is incorporated into the travel stop, and it does buffer the harshness of the lower part of the kingpin 3 hitting the travel stop, but the flexible bushing is not in a point which effects the performance of the suspension.

The upper strut 25, and the lower strut 27 are suitable receptacles for damping material to reduce oscillations due to spring action. Damping would, however, be subject to vehicle demands. Different damping schemes could be employed on various springs without substantially altering suspension performance.

SUMMARY

Scope and Ramifications—The flex arm suspension is unique among suspensions. It can provide camber change free travel, provide optimal wheel contact, eliminate negative toe, and eliminate scuffing all while providing a controllable ride. Even more importantly, the flex arm suspension does all of these things at the same time, without sacrificing one thing for another. The compound jointed arm design and the opposing springs are what allow this to occur, and are the cornerstones of the flex arm suspension. These features are that sets the flex arm suspension apart from other suspensions.

The gains achieved by the flex arm suspension are appreciable. Camber change free travel means the wheel can remain in constant, unchanging contact with the driving surface. That means the traction surface of the wheel stays in constant unchanging contact with the driving surface, providing maximum traction at all times. Providing optimal wheel contact with the driving surface increases the safety of the flex arm suspension. The flex arm suspension allows the wheel to adjust to minor irregularities in the driving surface, that for other suspensions would mean a loss of maximum contact with the driving surface. Maintaining maximum wheel contact both during suspension travel and while driving over surface irregularities is a substantial safety benefit, and of considerable importance reguardless of vehicle type.

Eliminating negative toe reduces wear on the wheel. In straight ahead driving, even during acceleration and deceleration, or while driving over uneven surfaces, the flex arm suspension maintains nearly ideal neutral toe. This feature alone would save considerable wear on the wheel, but coupled with the ability of the flex arm suspension to maintain it position relative to the driving surface during suspension travel, which substantially eliminates the phenomenon known as scuffing, wear is reduced still further. From a straight economic standpoint, the ramifications are clear. Less wear means longer use of the wheel. The ramifications of this, however, extend beyond economics. Less wear can also mean materials with greater traction potentials can be used. Often, materials with the most traction potential are either not used, or used sparingly because they wear away quicker. A suspension that is less harsh on traction materials may encourage manufactures to employ such materials, and again, a safety benefit is realized.

The flex arm suspension is also a low profile, compact suspension which would allow for lower vehicle profiles.

To sum up what the flex arm suspension is, and what it means, it is perhaps best to say it is a neutral platform upon which to build. There is little, or no need to design around the shortcomings of the flex arm suspension, as there may be in other suspensions. Many of the compromises of suspension design can now be ignored and more concentration can be placed on maximizing suspension performance, and indeed, vehicle performance.

The flex arm suspension is a suspension that uses some very standard concepts in physics and geometry to achieve its high level of performance. Because it does use these standard concepts, plus the fact that there are numerous approaches to any concept, there are in fact numerous approaches to the flex arm suspension. The flex arm suspension is not a refinement of some existing suspension, but a new concept in suspension design. Clearly, a compounded jointed arm assembly that allows the wheel to travel multiple paths and straight lines can manifest itself in many ways. Opposing springs that o not change wheel direction with their force, but rather absorb the inertia as imparted by the driving surface can be set in many ways. These variations may not be practical, or convenient, but possible. The scope is then only touched upon in the text, and legally covered in the claims, and is not limited to the figures and draftings, or the descriptive passages.

I claim:

1. An independent vehicle suspension comprising a spindle assembly, multiple jointed arm assemblies for holding said spindle assembly perpendicular to the centerline of said vehicle by mounting at the top and bottom to said spindle assembly by rotating joint means, where each assembly of said arm assemblies makes for an arm assembly containing three points of rotation, which one point of rotation of said three points of rotation is said rotating joint means, which mounts one end of said arm assembly to said spindle assembly, allowing said arm assembly to rotate freely about said rotating joint means, a second point of said three points of rotation includes a pivot mounting means for mounting the other end of said arm assembly to said vehicle, allowing said arm assembly to rotate freely about said pivot mounting means, and a third point of said three points of rotation includes an axial rotating joint means, where said third point has a position between said rotating joint means and said pivot mounting means, such that said axial rotating joint means divides said arm assembly into two arms, and allowing said two arms to rotate freely about said axial rotating joint means, and where an inner arm of said two arms spans from said pivot mounting means to said axial rotating joint means, and where an outer arm of said two arms spans from said axial rotating joint means to said rotating joint means, springs for imparting restoring forces to said arm assemblies by mounting to said arm assemblies and holding said arm assemblies against rotations about said pivot mounting means, a pair of spring loaded struts imparting force onto said spindle assembly, such that a top strut of said struts, having a position wholly above a center of said spindle assembly, and with one end of said top strut mounting to said spindle assembly at some point wholly above said center of said spindle assembly by rotating mounting means, and allowing said top strut to rotate freely about said rotating mounting means, and the other end of said top strut mounting to said vehicle by axial pivoting mounting means, and allowing said top strut to rotate freely about said axial pivoting mounting means, and such that a bottom strut of said struts, having a position wholly below said center of said spindle assembly, and with one end of said bottom strut mounting to said spindle assembly at some point wholly below said center of said spindle assembly by said rotating mounting means, allowing said bottom strut to rotate freely about said rotating mounting means, and the other end of said bottom strut mounting to said vehicle by said axial pivoting mounting means, and allowing said bottom strut to rotate freely about said axial pivoting mounting means, where said springs and said struts make for an arrangement which combines the effects of said restoring forces and said force to form a spring and strut means for controlling response of said suspension to the driving surface, and for returning said suspension to a steady state, wherein said steady state includes said force and said restoring forces balancing with the weight of said vehicle at rest and the resulting position of said suspension, said suspension including a travel stop means for limiting inward travel of said suspension beyond a predetermined limit.

2. An independent suspension as defined in claim 1 wherein said arm assemblies number four, such that one said arm assembly mounts at some point substantially at the top right on said spindle assembly by said rotating joint means, a second said arm assembly mounts at some point substantially at the top left on said spindle assembly by said rotating joint means, a third said arm assembly mounts at some point substantially at the bottom right on said spindle assembly by said rotating joint means, and a fourth said arm assembly mounts at some point substantially at the bottom left on said spindle assembly by said rotating joint means, and such that said some point substantially at the top right and said some point substantially at the top left have positions wholly above said center of said spindle assembly, and such that said some point substantially at the bottom right and said some point substantially at the bottom left have positions wholly below said center of said spindle assembly, wherein said three points of rotation for said arm assembly allows movement in only one plane, such that each said arm assembly, of said assemblies, has a similar movement about said three points of rotation as to form a similar plane as to said one plane, and such that all planes of motion of said arm assemblies are parallel to said one plane, and wherein said rotating joint means allows said spindle assembly to rotate about said rotating joint means in one definite plane, such that said one definite plane is parallel to said all planes, and such that said one definite plane contains a bisecting line which extends through said center of said spindle assembly and intersects said centerline perpendicularly, and such that said one definite plane is perpendicular to said driving surface.

3. An independent suspension as defined in claim 1 wherein said arm assemblies form, at said steay state, angles, of which said axial rotating joint means make vertices for said angles, such that each said arm assembly makes an individual angle, and said axial rotating joint means therein makes for the vertex of said individual angle, where said arm assembly alters the degree of said individual angle as said three points of rotation allow said arm assembly to rotate about said three points of rotation, and such that each said arm assembly alters the respective degree of each said individual angle as each said three points of rotation respectively allow each said arm assembly, of said arm assemblies, to rotate respectively about each said three points of rotation, such that all said arm assemblies alter said angles as a means to allow said spindle assembly to move in any direction within a plane which contains a bisecting line drawn through said center of said spindle assembly and intersects said centerline perpendicularly, and such that said plane is perpendicular to said driving surface.

4. An independent suspension as defined in claim 1 wherein said springs hold said arm assemblies at angles against said force of said struts, wherein said struts impart said force, in part, outwardly on said spindle assembly and in a manner which attempts to extend said arm assemblies, and wherein said spring and strut means divides into an upper spring and strut combination and a lower spring and strut combination, with said top strut and said springs which mount to said arm assemblies which mount to said top of said spindle assembly making for said upper spring and strut combination and with said bottom strut and said springs which mount to said arm assemblies which mount to said bottom of said spindle assembly making for said lower spring and strut combination, wherein the vector force component representation of forces imparted by said upper spring and strut combination shows for said springs involved in said upper spring and strut combination at said rotating joint means at said top of said spindle assembly, a downward vertical force component and an inward horizontal force component at said steady state, wherein said top strut vector force representation shows for said top strut at said rotating mounting means another downward vertical force component and an outward horizontal force component at said steady state, and wherein the vector force component representation of forces imparted by said lower spring and strut combination shows for said springs involved in said lower spring and strut combination at said rotating joint means at said bottom of said spindle assembly, an upward vertical force component and an inwardly horizontal force component at said steady state, wherein said bottom strut vector force representation shows for said bottom strut at said rotating mounting means another upward vertical force component and an outwardly horizontal force component at said steady state, such that total horizontal force components for said upper spring and strut combination add to zero at an appropriate force moment, and such that summed horizontal force components for said lower spring and strut combination add to zero at a similar appropriate force moment, and such that said appropriate force moment and said similar appropriate force moment make for appropriate force moments, wherein said total horizontal force components and said summed horizontal force components maintain zero sums at said appropriate force moments when said spindle assembly moves along an ideal line due to force characteristics of said springs and said spring loaded struts, wherein derivation of said appropriate force moments comes from said ideal line, wherein a relaxed position of said upper spring and strut combination, unimpinged by said lower spring and strut combination, places said spindle assembly at some point on said ideal line below said steady state, and a similar relaxed position of said lower spring and strut combination, unimpinged by said upper spring and strut combination, places said spindle assembly at some point on said ideal line above said steady state.

5. An independent suspension as defined in claim 1 wherein said travel stop means, including a rigid frame means mounting to said vehicle by rotational mounting means and allowing said rigid frame means to rotate freely about said rotational mounting means, housing a slide, with one end of said slide mounting to said bottom of said spindle assembly by rotational joint means, and with the other end of said slide fitting within said rigid frame means and allowing said slide to extend freely from said rigid frame means to match the progress of said suspension, and by providing sufficient guidance said rigid frame means assures said slide easily matches any orientation said spindle assembly may take, and by stopping said slide from compressing inward beyond a certain limit into said rigid frame means, said rigid frame means assures said predetermined limit, and wherein said travel stop means takes a certain position by rotating about said rotational mounting means and said rotational joint means as said travel stop means responds to said suspension travel to limit said inward travel to said predetermined limit, and such that at said predetermined limit results from said certain position and said certain limit and substantially equals a distance between said rotational mounting means and said rotational joint means when said suspension has reached said steady state.

6. An independent vehicle suspension comprising multiple jointed arm assembly means for allowing a spindle assembly to take any path within a plane of suspension travel, arm assemblies for holding said spindle assembly perpendicular to a centerline of said vehicle and mounting top and bottom to said spindle assembly by rotating joint means in a manner making for said multiple jointed arm assembly means, and where each assembly of said arm assemblies makes for an arm assembly containing three points of rotation, where one point of rotation of said three points of rotation is said rotating joint means, which mounts one end of said arm assembly to said spindle assembly, allowing said arm assembly to rotate freely about said rotating joint means, a second point of rotation of said three points of rotation includes a pivot mounting means for mounting the other end of said arm assembly to said vehicle, allowing said arm assembly to rotate freely about said pivot mounting means, and a third point of rotation of said three points of rotation includes an axial rotating joint means, where said third point has a position between said rotating joint means and said pivot mounting means, such that said axial rotating means divides said arm assembly into two arms, and allowing said two arms to rotate freely about said axial rotating joint means, and where an inner arm of said two arms spans from said pivot mounting means to said axial rotating joint means, and where an outer arm of said two arms spans from said axial rotating joint means to said rotating joint means, springs for imparting restoring forces onto said arm assemblies by mounting to said arm assemblies and holding said arm assemblies at angles while resisting rotations of said arm assemblies about said pivot mounting means, wherein said springs, one end of each spring of said springs respectively mounts to each said inner arm of each said arm assembly, of said arm assemblies, by spring mounting means, and the other end of each said spring mounts to said vehicle by mounting means, a pair of spring loaded struts imparting force onto said spindle assembly, such that a top strut of said struts having a position wholly above a center of said spindle assembly, and with one end of said top strut mounting to said spindle assembly at some point wholly above said center of said spindle assembly by rotating mounting means, and allowing said top strut to rotate freely about said rotating mounting means, and the other end of said top strut mounting to said vehicle by axial pivoting mounting means, and allowing said top strut to rotate freely about said axial pivoting mounting means, and such that a bottom strut of said struts having a position wholly below said center of said spindle assembly, and with one end of said bottom strut mounting to said spindle assembly at some point wholly below said center of said spindle assembly by said rotating mounting means, and allotting said bottom strut to rotate freely about said rotating mounting means, and the other end of said bottom strut mounting to said vehicle by axial pivoting mounting means, and allowing said bottom strut to rotate freely about said pivoting mounting means, where said springs and said struts combine to form a spring and strut means for controlling suspension response to a driving surface, and for returning said suspension to a steady state, and where said spring and strut means divides into two combinations including an upper spring and strut combination and a lower spring and strut combination, such that said top strut and said springs which mount to said arm assemblies which mount to said top of said spindle assembly make for said upper spring and strut combination, and such that said bottom strut and said springs which mount to said arm assemblies which mount to said bottom of said spindle assembly make for said lower spring and strut combination, where said top strut substantially maintains positioning resisting both upward forces and inward forces as directed through said spindle assembly while simultaneously resisting said restoring forces of said springs, and substantially said springs of said upper spring and strut combination, as directed through said rotating joint means, and where said bottom strut substantially maintains positioning resisting both downward forces and said inward forces as directed through said spindle assembly while simultaneously resisting said restoring forces of said springs and substantially said restoring forces of said springs of said lower spring and strut combination, a travel stop means for limiting said suspension travel inwards beyond a predetermined point, and lateral support means for supporting said arm assemblies and providing stability such that motion of said spindle assembly remains substantially within said plane of suspension travel.

7. An independent suspension as defined in claim 6 wherein said arm assemblies number four, and have a symmetrical arrangement about said spindle assembly such that one said arm assembly mounts at some point substantially at the top right on said spindle assembly by said rotating joint means, a second said arm assembly mounts at some point substantially at the top left on said spindle assembly by said rotating joint means, a third said arm assembly mounts at some point substantially at the bottom right on said spindle assembly by said rotating joint means, and a fourth said arm assembly mounts at some point substantially at the bottom left on said spindle assembly by said rotating joint means, and such that said some point substantially at the top right and said some point substantially at the top left have positions wholly above said center of said spindle assembly, and such that said some point substantially at the bottom right and said some point substantially at the bottom left have positions wholly below said center of said spindle assembly, wherein said three points of rotation for said arm assembly allows motion in only one plane, and such that all planes of motion of said arm assemblies are parallel to said one plane, and such that said rotating joint means allows said spindle assembly to rotate freely about said rotating joint means in one definite plane, and such that said one definite plane is parallel to said one plane, and wherein said lateral support means, including supporting members mounting to said two arms and moving in unison with a particular arm of said two arms to which a member, of said members, mounts, and mounting in a manner such that said members substantially maintain movement parallel to said one plane, and such that in combination said members make for said lateral support means, and such that said lateral support means substantially maintains movement of said spindle assembly within said one definite plane and wherein said plane of travel contains said one definite plane.

8. An independent suspension as defined in claim 6 wherein said arm assemblies number four, and said spring and strut means hold said arm assemblies at said angles such that said axial rotating joint means make vertices for said angles, such that each arm assembly makes an individual angle, and said axial rotating joint therein makes for the vertex of said individual angle, where said arm assembly alters the degree of said individual angle as said three points of rotation allow said arm assembly to rotate about said three points of rotation, such that each said arm assembly alters the respective degree of each said individual angle as each said three points of rotation respectively allow each said arm assembly of said arm assemblies to rotate respectively about each said three points of rotation, and such that all said arm assemblies at said angles in combination make for said multiple jointed arm assembly means, which due to the particular arrangement of said arm assemblies of said multiple jointed arm assembly means, allows said spindle assembly said travel in any direction within said plane of travel.

9. An independent suspension as defined in claim 6 wherein said upper spring and strut combination has force components such that a horizontal force component of said top strut substantially opposes a horizontal force component of said springs of said upper spring and strut combination as said suspension progresses along a line perpendicular to said driving surface within said plane of travel, and such that a vertical force component of said top strut substantially reinforces a vertical force component of said springs of said upper spring and strut combination as said suspension progresses along said line perpendicular to said driving surface within said plane of travel, wherein said lower spring and strut combination has separate force components, such that a horizontal force component of said bottom strut substantially opposes a horizontal force component of said springs of said lower spring and strut combination as said suspension progresses along said line perpendicular to said driving surface within said plane of travel, and such that a vertical force component of said bottom strut substantially reinforces a vertical force component of said springs of said lower spring and strut combination as said suspension progresses along said line perpendicular to said driving surface within said plane of travel, and wherein said force components and said separate force components have opposing vertical components, such that said force components has a downwardly vertical component of said opposing vertical components, and said separate force components has an upwardly vertical component, and wherein said force of said struts makes for outwardly directed horizontal force components.

10. An independent suspension as defined in claim 6 wherein said pivoting mounting means share common axes, where said common axes number two, such that one said common axes makes for an upper axis, and a second of said common axes makes for a lower axis, where all said pivoting mounting means for said arm assemblies which mount to said top of said spindle assembly share said upper axis, and where all pivoting mounting means for said arm assemblies which mount to said bottom of said assembly share said lower axis.

11. An independent suspension as defined in claim 6 wherein said travel stop means, including a rigid frame means mounting to said vehicle by rotational mounting means and allowing said rigid frame means to rotate freely about said rotational mounting means, housing a slide, with one end of said slide mounting to said bottom of said spindle assembly by rotational joint means and allowing said slide to rotate freely about said rotational joint means, and with the other end of said slide fitting within said rigid frame means and allowing said slide to extend freely from said rigid frame means to match the progress of said suspension, and by providing sufficient guidance said rigid frame means assures said slide easily matches any orientation said spindle assembly may take, and by stopping said slide from compressing inward beyond a certain limit into said rigid frame means, said rigid frame means assures said predetermined limit, and wherein said travel stop means takes a certain position by rotating about said rotational mounting means and said rotational joint means as said travel stop means responds to said suspension travel to limit said inward travel to said predetermined limit, and such that said predetermined limit results from said certain position and said certain limit and substantially equals a distance between said rotational mounting means and said rotational joint means when said suspension has reached said steady state.

12. An independent suspension as defined in claim 6 wherein said springs number four, and comprise leaf springs, such that one end of said spring of springs respectively mounts to each inner arm of said arm assemblies at some point substantially about said axial rotating joint means by said spring mounting means.

* * * * *